(12) United States Patent
Matsumoto et al.

(10) Patent No.: US 10,732,087 B2
(45) Date of Patent: Aug. 4, 2020

(54) LIQUID DROPLET FORMING DEVICE, DISPENSING DEVICE, AND METHOD OF PREPARING BASE MATERIAL

(71) Applicants: Takahiko Matsumoto, Kanagawa (JP); Manabu Seo, Kanagawa (JP); Daisuke Takagi, Kanagawa (JP)

(72) Inventors: Takahiko Matsumoto, Kanagawa (JP); Manabu Seo, Kanagawa (JP); Daisuke Takagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/029,744

(22) Filed: Jul. 9, 2018

(65) Prior Publication Data

US 2018/0340880 A1 Nov. 29, 2018

Related U.S. Application Data

(63) Continuation of application No. PCT/JP2017/000735, filed on Jan. 12, 2017.

(30) Foreign Application Priority Data

Jan. 26, 2016 (JP) .................. 2016-012260
Sep. 9, 2016 (JP) .................. 2016-176812

(51) Int. Cl.
*G01N 15/14* (2006.01)
*G01N 21/64* (2006.01)
(Continued)

(52) U.S. Cl.
CPC .............. *G01N 15/14* (2013.01); *B05C 5/00* (2013.01); *B05C 11/00* (2013.01);
(Continued)

(58) Field of Classification Search
CPC ....... B05C 5/00; B05C 11/00; G01N 15/1427; G01N 15/1459; G01N 15/1463;
(Continued)

(56) References Cited

U.S. PATENT DOCUMENTS 5,180,065 A * 1/1993 Touge ................ G01N 15/1404
209/3.1
5,700,692 A * 12/1997 Sweet ................ G01N 15/1404
209/577
(Continued)

FOREIGN PATENT DOCUMENTS

EP          1608963      12/2005
JP          S60-080764   5/1985
(Continued)

OTHER PUBLICATIONS

International Search Report dated Mar. 28, 2017 in PCT/JP2017/000735 filed on Jan. 12, 2017.
(Continued)

*Primary Examiner* — Sang H Nguyen
(74) *Attorney, Agent, or Firm* — IPUSA, PLLC

(57) ABSTRACT

A liquid droplet forming device includes a liquid droplet discharger that discharges, as a liquid droplet, a particle suspension liquid in which one or more fluorescent particles are suspended; a light source for irradiating light onto the flying liquid droplet discharged from the liquid droplet discharger; a photodetector that receives fluorescence that is emitted by the one or more fluorescent particles included in the liquid droplet in response to the light as excitation light; and a particle number detector that detects a number of the one or more fluorescent particles included in the liquid droplet based on information from the photodetector.

11 Claims, 15 Drawing Sheets

(51) Int. Cl.
  *B05C 5/00* (2006.01)
  *B05C 11/00* (2006.01)
  *G01N 35/10* (2006.01)

(52) U.S. Cl.
  CPC ..... *G01N 15/1427* (2013.01); *G01N 15/1459* (2013.01); *G01N 15/1463* (2013.01); *G01N 21/64* (2013.01); *G01N 35/10* (2013.01); *G01N 2015/149* (2013.01); *G01N 2015/1481* (2013.01); *G01N 2015/1486* (2013.01); *G01N 2035/1034* (2013.01)

(58) Field of Classification Search
  CPC ........ G01N 15/14; G01N 35/10; G01N 21/64; G01N 2015/1486; G01N 2015/149; G01N 2015/1481; G01N 2035/1034
  See application file for complete search history.

(56) References Cited

U.S. PATENT DOCUMENTS

| | | | |
|---|---|---|---|
| 6,248,590 B1* | 6/2001 | Malachowski | G01N 15/1404 209/127.4 |
| 6,372,506 B1* | 4/2002 | Norton | G01N 15/1404 209/127.4 |
| 7,024,316 B1* | 4/2006 | Ellison | G01N 15/1459 422/68.1 |
| 7,195,920 B2* | 3/2007 | Seidel | A01K 67/027 436/63 |
| 7,855,078 B2* | 12/2010 | Evans | G01N 15/1404 324/71.4 |
| 8,452,221 B2 | 5/2013 | Kaneko et al. | |
| 8,699,933 B2 | 4/2014 | Katano et al. | |
| 8,870,350 B2 | 10/2014 | Suzuki et al. | |
| 8,944,556 B2 | 2/2015 | Hihara et al. | |
| 9,010,915 B2 | 4/2015 | Usui et al. | |
| 9,102,138 B2 | 8/2015 | Suzuki et al. | |
| 9,470,617 B2* | 10/2016 | Durack | G01N 15/14 |
| 9,919,533 B2 | 3/2018 | Seo et al. | |
| 2003/0211009 A1* | 11/2003 | Buchanan | G01N 15/1456 422/63 |
| 2004/0169867 A1* | 9/2004 | Sharpe | G01N 15/14 356/621 |
| 2005/0062956 A1* | 3/2005 | Vesey | G01N 15/1459 356/30 |
| 2006/0139406 A1* | 6/2006 | Tsuchiya | B05D 1/26 347/54 |
| 2006/0180517 A1* | 8/2006 | Frazier | G01N 15/1459 209/579 |
| 2007/0059763 A1* | 3/2007 | Okano | G01N 33/566 435/7.1 |
| 2007/0195310 A1 | 8/2007 | Kanda | |
| 2008/0261295 A1 | 10/2008 | Butler et al. | |
| 2010/0044586 A1 | 2/2010 | Duhr et al. | |
| 2010/0285573 A1* | 11/2010 | Leck | B01L 3/5088 435/288.4 |
| 2011/0267457 A1 | 11/2011 | Weitz et al. | |
| 2013/0037623 A1 | 2/2013 | Yamaguchi | |
| 2014/0021370 A1 | 1/2014 | Suzuki et al. | |
| 2015/0132766 A1* | 5/2015 | Yasuda | G01N 21/6458 435/7.1 |
| 2017/0120604 A1* | 5/2017 | Seo | B41J 2/1707 |
| 2017/0186156 A1 | 6/2017 | Isoda et al. | |

FOREIGN PATENT DOCUMENTS

| | | |
|---|---|---|
| JP | 2002-372489 | 12/2002 |
| JP | 2005-315799 | 11/2005 |
| JP | 4013869 | 11/2007 |
| JP | 2009-150649 | 7/2009 |
| JP | 4357138 | 11/2009 |
| JP | 2010-510505 | 4/2010 |
| JP | 2010-525325 | 7/2010 |
| JP | 2011-509075 | 3/2011 |
| JP | 2014-008633 | 1/2014 |
| JP | 2014-020918 | 2/2014 |
| JP | 5716213 | 5/2015 |
| JP | 5768945 | 8/2015 |
| WO | 01/02836 | 1/2001 |
| WO | 2007/012000 | 1/2007 |
| WO | 2011/099287 | 8/2011 |
| WO | 2015/048173 | 4/2015 |

OTHER PUBLICATIONS

Partial European Search Report for 17743938.7 dated Jan. 7, 2019.
Linas Mazutis et al: "Single-cell analysis and sorting using droplet-based microfluidics", Nature Protocols, vol. 8, No. 5, Apr. 4, 2013 (Apr. 4, 2013), pp. 870-891, XP055240820, GB ISSN:1754-2189, DOI:10.1038/nprot.2013.046.

* cited by examiner

350₁  350₂

350₁  350₂

LIQUID DROPLET FORMING DEVICE, DISPENSING DEVICE, AND METHOD OF PREPARING BASE MATERIAL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/000735 filed on Jan. 12, 2017 and designating the U.S., which claims priority to Japanese Patent Application No. 2016-012260 filed on Jan. 26, 2016 and Japanese Patent Application No. 2016-176812 filed on Sep. 9, 2016. The entire contents of the foregoing applications are incorporated herein by reference.

BACKGROUND OF THE INVENTION

1. Field of the Invention

The present disclosure relates to relates to a liquid droplet forming device, a dispensing device, and a method of preparing base material.

2. Description of the Related Art

In recent years, with the development of stem cell technology, a technique has been developed such that an organism is formed by discharging a plurality of cells by inkjet. During discharging liquid droplets including particulate materials, which are represented by cells, it is important to detect what extent of particles are included in the discharged liquid droplet.

As an example of the device provided with such a function, there is a discharging device that counts a number of particles included in a liquid object (see Patent Document 1 (Japanese Patent No. 5716213), for example). This discharging device is capable of counting a number of particles included in a liquid object that passes through a detector that is formed between a cavity and a nozzle of the discharging device.

Further, technology related to a fine particle measuring device has been known, which is for detecting fluorescence that is generated from fine particles in response to irradiation of excitation light onto a liquid droplet including the fine particles (see Patent Document 2 (Japanese Unexamined Patent Publication No. 2014-020918), for example). The fine particle measuring device is capable of detecting intensity of fluorescence generated by fine particles in a flying liquid droplet.

A liquid droplet forming device described in Patent Document 1, however, counts a number of particles included in a liquid object immediately prior to flying, and the device does not directly count a number of particles included in a flying liquid droplet. The problem is that accuracy of detecting the number of particles included in the discharged liquid droplet is low because the number of the particles included in the liquid droplet immediately prior to flying may be or may not be equal to the number of the particles included in the flying liquid droplet.

Though the fine particle measuring device described in Patent Document 2 can measure a shape or fluorescence intensity of a liquid droplet, the device does not count a number of particles in the liquid droplet.

There is a need for a liquid droplet forming device with enhanced accuracy on detection of a number of particles included in a discharged liquid droplet.

SUMMARY OF THE INVENTION

According to an aspect of the present invention, there is provided a liquid droplet forming device including a liquid droplet discharger that discharges, as a liquid droplet, a particle suspension liquid in which one or more fluorescent particles are suspended; a light source for irradiating light onto the flying liquid droplet discharged from the liquid droplet discharger; a photodetector that receives fluorescence that is emitted by the one or more fluorescent particles included in the liquid droplet in response to the light as excitation light; and a particle number detector that detects a number of the one or more fluorescent particles included in the liquid droplet based on information from the photodetector.

According to the disclosed technology, a liquid droplet forming device can be provided that is provided with enhanced accuracy on detecting a number of particles included in a discharged liquid droplet.

DESCRIPTION OF THE PREFERRED EMBODIMENTS

Figure 1:
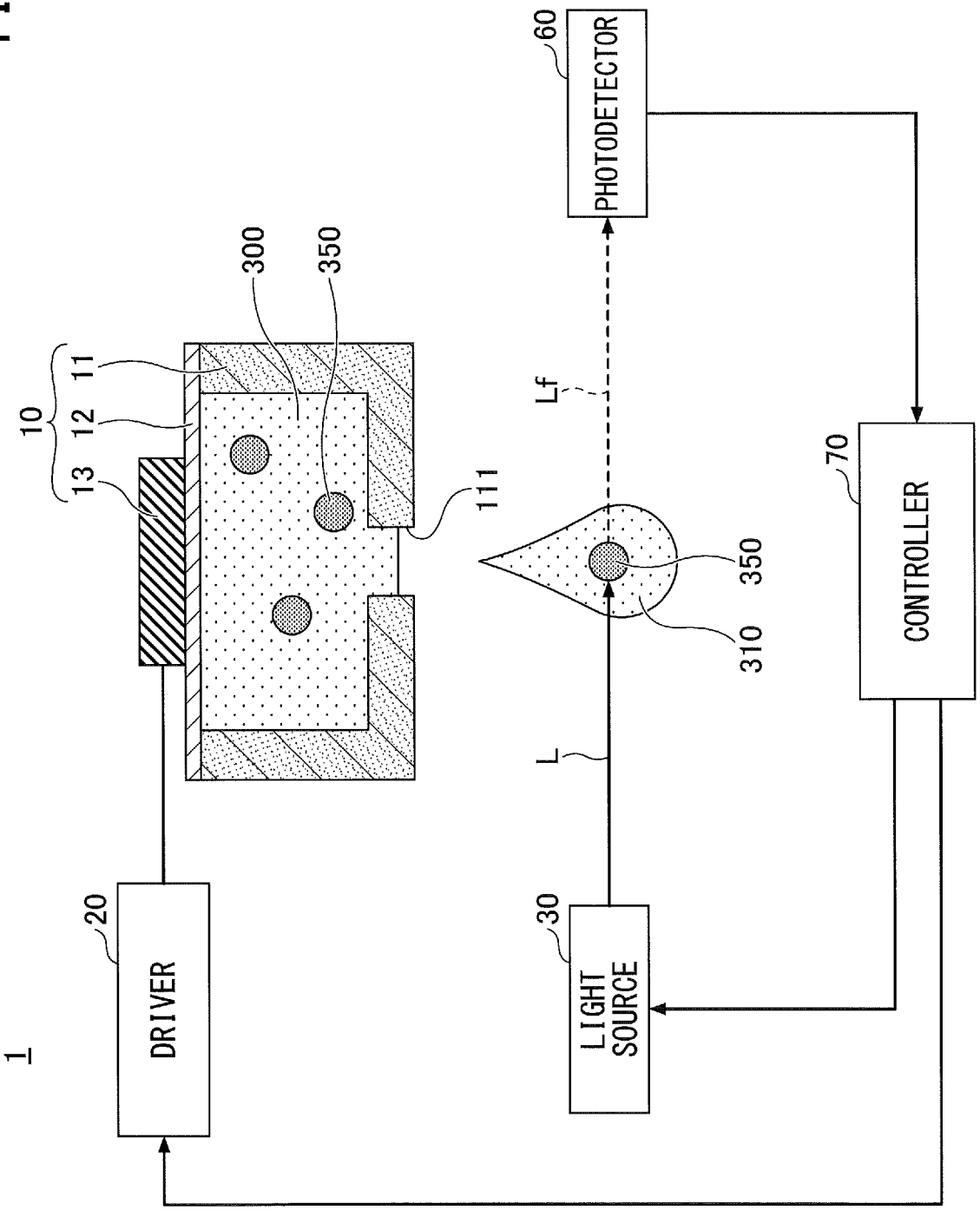
FIG. 1 is a schematic diagram exemplifying a liquid droplet forming device according to a first embodiment.

In the following, embodiments for carrying out the invention are described by referring to the drawings. In the drawings, the same reference numerals may be attached to the same components, and duplicate description may be omitted.

First Embodiment

[Structure of the Liquid Droplet Forming Device]

First, a liquid droplet forming device according to a first embodiment is described. FIG. 1 is a schematic diagram exemplifying the liquid droplet forming device according to the first embodiment. Referring to FIG. 1, the liquid droplet forming device 1 includes a liquid droplet discharger 10; a driver 20; a light source 30; a photodetector 60; and a controller 70.

The droplet discharger is not particularly limited; however, there are an inkjet head based on a piezoelectric pressure method using a piezoelectric element, an inkjet head based on a thermal method using a heater, an inkjet head based on an electrostatic method such that a liquid is pulled by electrostatic attraction, etc. Among these, the piezoelectric pressure method is favorable in that damage on fluorescent particles 350 by heat or an electric field is relatively small.

The liquid droplet discharger 10 includes a liquid chamber 11, a membrane 12, and a drive element 13. The liquid droplet discharger 10 is capable of discharging, as a liquid droplet, a particle suspension liquid 300 in which the fluorescent particles 350 are suspended (the fluorescent particles 350 are dispersed).

The liquid chamber 11 is a liquid reservoir for reserving the particle suspension liquid 300 in which the fluorescent particles 350 are suspended, and a nozzle 111, which is a through hole, is formed at a bottom surface side. The liquid chamber 11 can be formed of, for example, a metal, silicon, ceramic, etc. As the fluorescent particles 350, there are inorganic fine particles and organic polymer particles, etc., that are dyed with a fluorescent dye.

The membrane 12 is a film-shaped component that is secured to an upper end part of the liquid chamber 11. A planar shape of the membrane 12 may be, for example, a circular shape; however, the planar shape may be an elliptical shape, or a rectangular shape, etc.

The drive element 13 is formed on an upper surface side of the membrane 12. A shape of the drive element 13 can be designed to be adjusted to a shape of the membrane 12. For example, if a planar shape of the membrane 12 is a circular shape, it is preferable to form the drive element 13 having a circular shape.

By supplying a drive signal from the driver 20 to the drive element 13, the membrane 12 can be vibrated. By the vibration of the membrane 12, a liquid droplet 310 including a fluorescent particle 350 can be caused to be discharged from the nozzle 111.

When a piezoelectric element is used as the drive element 13, for example, a structure may be adopted such that electrodes for applying a voltage are formed on an upper surface and a lower surface of the piezoelectric material. In this case, by applying a voltage between the upper and lower electrodes of the piezoelectric element from the driver 20, compressive stress can be applied in a lateral direction in the paper plane, and the membrane 12 can be vibrated in the vertical direction in the paper plane. As the piezoelectric material, for example, lead zirconate titanate (PZT) can be used. In addition to this, various types of piezoelectric materials can be used, such as bismuth iron oxide, metal niobate, barium titanate, or a material obtained by adding a metal or a different oxide to these materials.

The light source 30 emits light L to the flying liquid droplet 310. Note that flying refers to a state of the liquid droplet 310 from being discharged from the liquid droplet discharger 10 until the liquid droplet 310 is dropped onto a drop target object. The flying droplet 310 has an approximate circular shape at a position at which the light L is irradiated. A beam shape of the light L is an approximate circular shape.

Here, a beam diameter of the light L is preferably approximately from 10 times to 100 times of the diameter of the liquid droplet 310. The reason is to ensure that the light L from the light source 30 is irradiated onto the liquid droplet 310, even if the position of the liquid droplet 310 varies. However, it is not preferable that the beam diameter of the light L significantly exceeds 100 times of the diameter of the liquid droplet 310. The reason is that energy density of the light irradiated onto the liquid droplet 310 is reduced, and the light quantity of the fluorescence Lf that is emitted as the excitation light of the light L is so reduced to be difficult to be detected by the photodetector 60.

It is preferable that the light L emitted from the light source 30 be pulsed light; and, for example, a solid laser, a semiconductor laser, a dye laser, etc., can preferably be used. When the light L is pulsed light, a pulse width may preferably be less than or equal to 10 μs, and more preferably be less than or equal to 1 μs. The energy per unit pulse largely depends on the optical system such as the presence or absence of convergence; however, the energy per unit pulse may preferably be greater than or equal to approximately 0.1 μJ, and more preferably greater than or equal to 1 μJ.

When the flying liquid droplet 310 includes the fluorescent particle 350, the photodetector 60 receives the fluorescence Lf that is emitted by the fluorescent particle 350 by absorbing the light L as the excitation light. Since the fluorescence Lf is emitted in all directions from the fluorescent particle 350, the photodetector 60 can be located at any position at which the fluorescence Lf can be received. At this time, in order to enhance the contrast, the photodetector 60 may preferably be located at a position at which the light L emitted from the light source 30 does not directly enter.

The photodetector 60 is not particularly limited, provided that the photodetector 60 is an element that can receive the fluorescence Lf emitted from the fluorescent particle 350. As the photodetector 60, for example, there is one-dimensional element, such as a photodiode and a photo sensor. However, if highly sensitive measurement is required, a photomultiplier or an avalanche photodiode may preferably be used. As the photodetector 60, for example, a two-dimensional element may be used, such as a Charge Coupled Device (CCD), a Complementary Metal Oxide Semiconductor, or a gate CCD.

The fluorescence Lf emitted by the fluorescent particle 350 is weaker than the light L emitted by the light source 30. Thus, a filter for attenuating the wavelength range of the light L may be installed at a front side (the light receiving surface side) of the photodetector 60. As a result, a very high contrast image of the fluorescent particle 350 can be obtained on the photodetector 60. As the filter, for example, a notch filter for attenuating a specific wave range including the wavelength of the light L can be used.

As described above, the light L emitted from the light source 30 is preferably pulsed light. However, the light L emitted from the light source 30 may be continuously oscillating light. In this case, by controlling the photodetector 60 so that the photodetector 60 can capture the light at a timing at which the continuously oscillating light is irradiated onto the flying liquid droplet 310, the fluorescence Lf may be received by the photodetector 60.

The controller 70 is provided with a function for controlling the driver 20 and the light source 30. Additionally, the controller 70 is provided with a function for obtaining information based on the light quantity received by the photodetector 60 and detecting a number of the fluorescent particles 350 (including a case of zero) included in the liquid droplet 310. In the following, by referring to FIGS. 2 through 4, the operation of the liquid droplet forming device 1 is described, which includes the operation of the controller 70.

Figure 2:
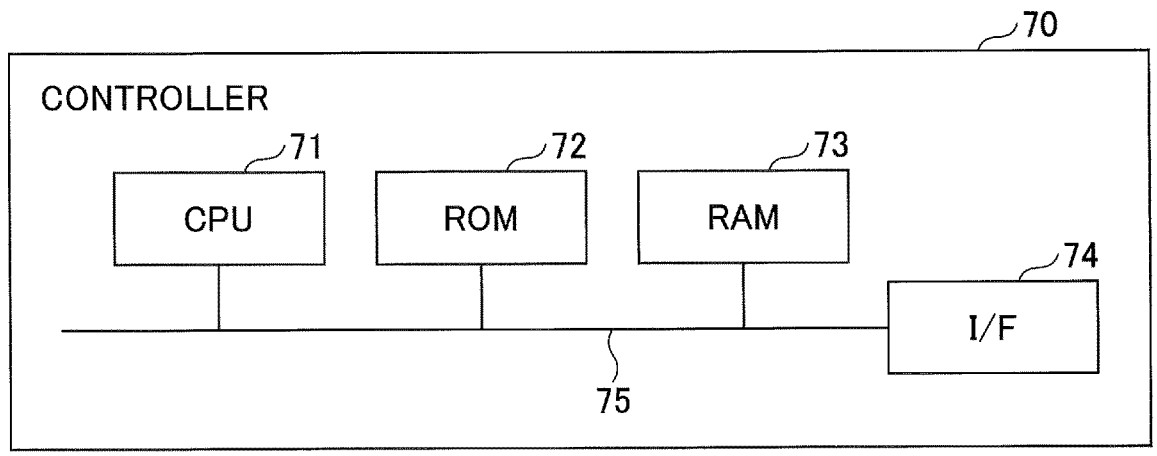
FIG. 2 is a diagram exemplifying hardware blocks of a controller of FIG. 1.
Figure 3:
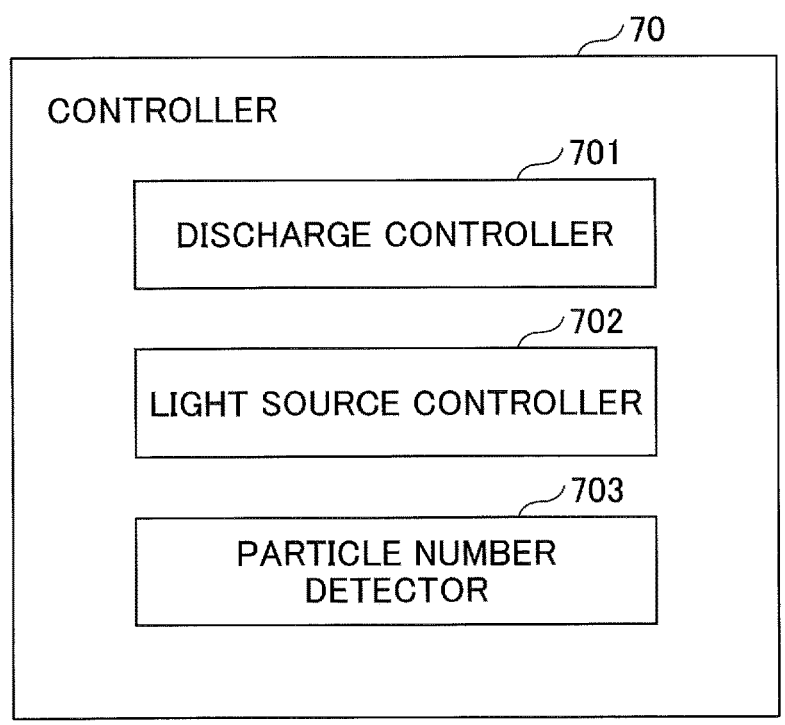
FIG. 3 is a diagram exemplifying functional blocks of the controller of FIG. 1.
Figure 4:
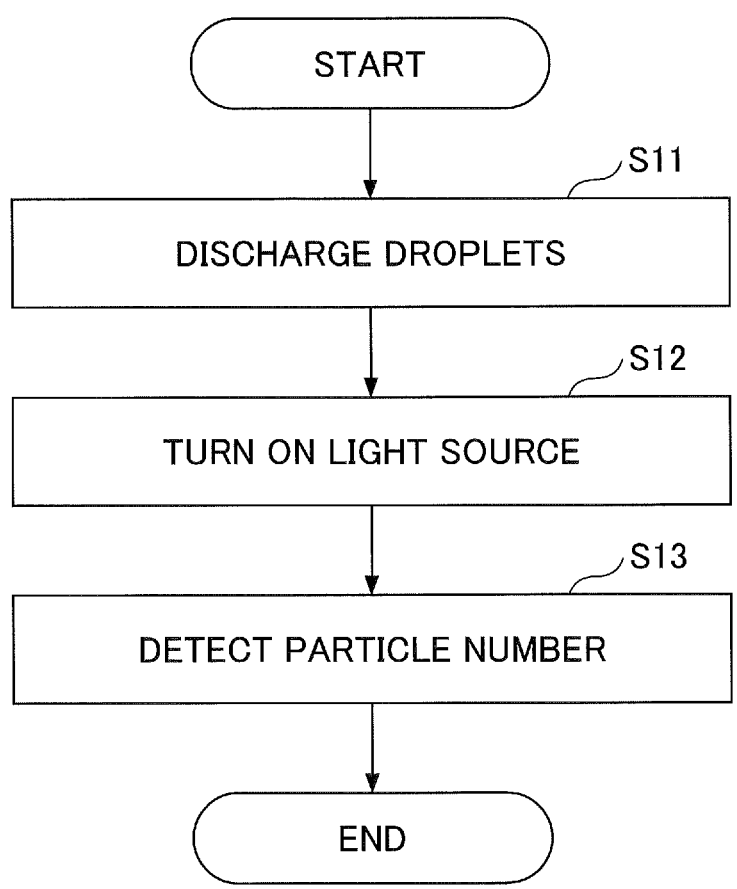
FIG. 4 is an example of a flowchart illustrating an operation of the liquid droplet forming device according to the first embodiment.

FIG. 2 is a diagram exemplifying hardware blocks of the controller of FIG. 1. FIG. 3 is a diagram exemplifying functional blocks of the controller of FIG. 1. FIG. 4 is an example of a flowchart illustrating the operation of the liquid droplet forming device according to the first embodiment.

Referring to FIG. 2, the controller 70 includes a CPU 71; a ROM 72; a RAM 73; an I/F 74; and a bus line 75. The CPU 71, the ROM 72, the RAM 73, and the I/F 74 are mutually coupled through the bus line 75.

The CPU 71 controls each function of the controller 70. The ROM 72 that is a storage stores a program that is executed by the CPU 71 to control each function of the controller 70 and various types of information. The RAM 73 that is a storage is used as a work area of the CPU 71. The RAM 73 is capable of temporarily storing predetermined information. The I/F 74 is an interface for connecting the liquid droplet forming device 1 to another device. The liquid droplet forming device 1 may be coupled to an external network through the I/F 74.

Referring to FIG. 3, the controller 70 includes, as functional blocks, a discharge controller 701; a light source controller 702; and a particle number detector 703.

By referring to FIG. 3 and FIG. 4, detection of a number of particles by the liquid droplet forming device 1 is described. First, at step S11, the discharge controller 701 of the controller 70 outputs a discharge command to the driver 20. The driver 20 that receives the discharge command from the discharge controller 701 causes the membrane 12 to vibrate by supplying a drive signal to the drive element 13. By vibration of the membrane 12, the liquid droplet 310 including the fluorescent particle 350 is discharged from the nozzle 111.

Next, at step S12, the light source controller 702 of the controller 70, while being synchronized with discharging of the liquid droplet 310 (while being synchronized with the drive signal supplied to the liquid droplet discharger 10 from the driver 20), outputs a command for turning on the light source 30. As a result, the light source 30 is turned on, and the light L is irradiated onto the flying liquid droplet 310.

Here, synchronized does not mean that the light is emitted at the same time as the liquid droplet discharger 10 discharges the liquid droplet 310 (at the same time as the driver 20 supplies the drive signal to the liquid droplet discharger 10), but synchronized means that the light source 30 emits light at a timing at which the flying liquid droplet 310 reaches a predetermined position so that the light L is irradiated onto the liquid droplet 310. Namely, the light source controller 702 controls the light source 30 so that emission of the light is delayed by a predetermined time with respect to discharging of the liquid droplet 310 by the liquid droplet discharger 10 (the drive signal supplied to the liquid droplet discharger 10 from the driver 20).

For example, the velocity v of the liquid droplet 310 discharged at a moment at which the drive signal is supplied to the liquid droplet discharge 10 is measured in advance. Then, based on the measured velocity v, the time t from discharging of the liquid droplet 310 until the liquid droplet 310 reaches the predetermined position is calculated, and the timing for emitting the light by the light source 30 is delayed by t with respect to the timing for supplying the drive signal to the liquid droplet discharger 10. As a result, favorable light emission control is enabled, and it can be ensured to irradiate the light from the light source 30 onto the liquid droplet 310.

Next, at step S13, the particle number detector 703 of the controller 70 detects a number of fluorescent particles 350 included in the liquid droplet 310 (which includes a case of zero) based on the information from the photodetector 60. Here, the information from the photodetector 60 may be a brightness value (the light quantity) or an area value of the fluorescent particles 350.

The particle number detector 703 is capable of counting a number of the fluorescent particles 350, for example, by comparing a light quantity received by the photodetector 60 and a preconfigured threshold value. In this case, a one-dimensional element or a two-dimensional element may be used as the photodetector 60.

When a two-dimensional element is used as the photodetector 60, the particle number detector 703 may use a method of performing image processing for calculating the brightness value or the area of the fluorescent particles 350 based on the two-dimensional image obtained from the photodetector 60. In this case, the particle number detector 703 can count the number of the fluorescent particles 350 by calculating the brightness value or the area of the fluorescent particles 350 by image processing, and by comparing the calculated brightness value or the calculated area value with a preconfigured threshold value.

Note that the fluorescent particles 350 may be cells or stained cells. A stained cell is a cell stained with a fluorescent dye or a cell capable of expressing a fluorescent protein. When the fluorescent particles 350 are cells, the photodetector 60 receives autofluorescence of the cells, and the particle number detector 703 counts the number of the fluorescent particles 350 included in the liquid droplet 310.

In stained cells, examples of fluorescent dyes include cell tracker orange and cell tracker red. Examples of fluorescent protein include green fluorescent protein (GFP; green fluorescent protein), read fluorescent protein (RFP; read fluorescent protein); and yellow fluorescent protein (YFP; yellow fluorescent protein).

As described above, in the liquid droplet forming device 1, a drive signal is supplied from the driver 20 to the liquid droplet discharger 10 reserving the particle suspension liquid 300 in which the fluorescent particles 350 are suspended so as to discharge the liquid droplet 310 including the fluorescent particles 350, and the light L from the light source 30 is irradiated onto the flying droplet 310. Then, the fluorescent particles 350 included in the flying liquid droplet 310 emit fluorescence Lf using the light L as the excitation light, and the photodetector 60 receives the fluorescence Lf. Further, based on the information from the photodetector 60, the particle number detector 703 counts the number of the fluorescent particles 350 included in the flying liquid droplet 310.

Namely, in the droplet forming device 1, detection accuracy of the number of the fluorescent particles 350 can be enhanced compared to usual one because the number of the fluorescent particles 350 included in the flying liquid droplet 310 is actually observed on the spot. Additionally, the light L is irradiated onto the fluorescent particles 350 included in the flying liquid droplet 310 to emit the fluorescence Lf, and the fluorescence Lf is received by the photodetector 60. As a result, a high contrast image of the fluorescent particles 350 can be obtained, and a frequency of occurrence of erroneous detection of the number of the fluorescent particles 350 can be reduced.

Modified Example 1 of the First Embodiment

Figure 5:
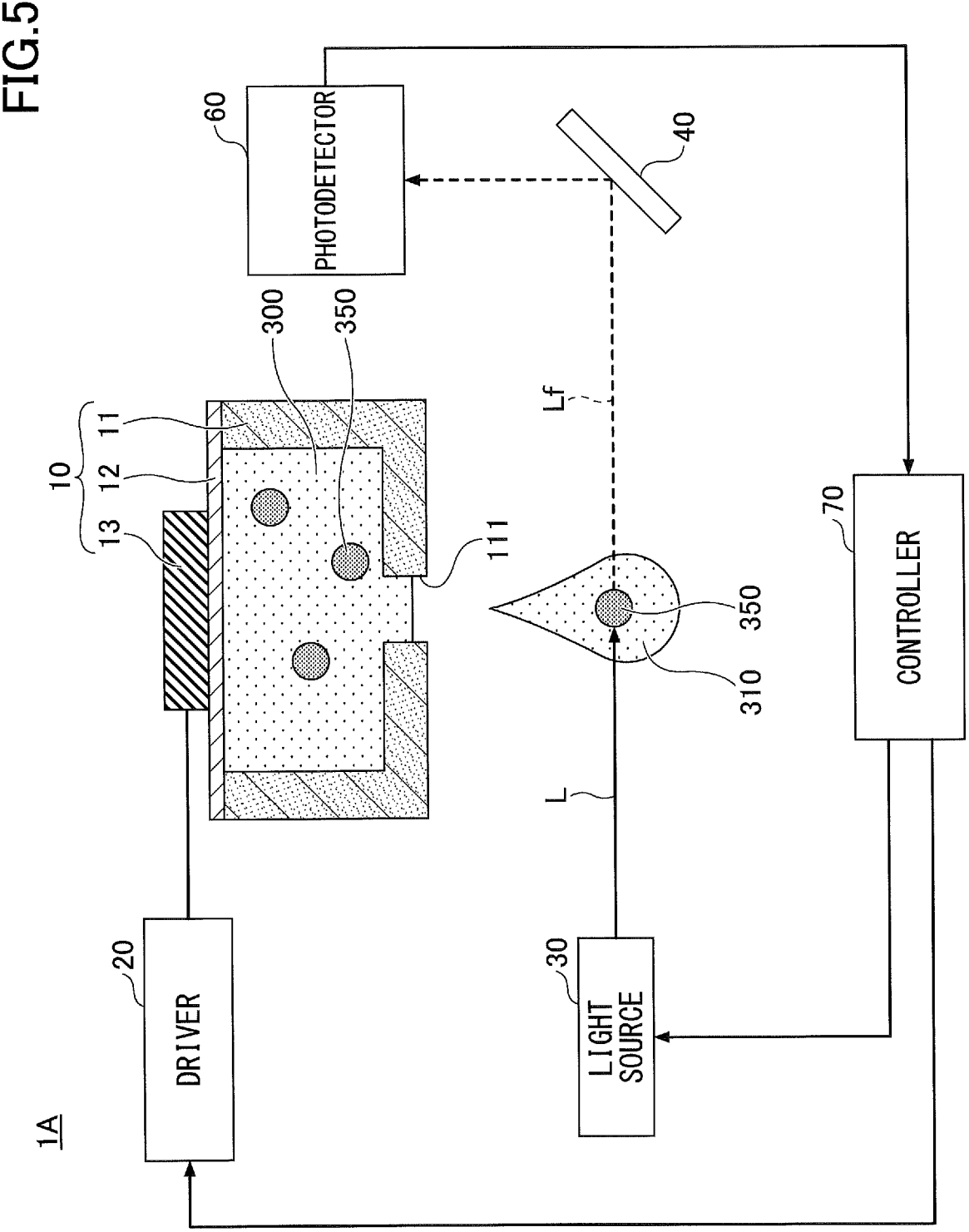
FIG. 5 is a schematic diagram exemplifying a droplet forming device according to a modified example 1 of the first embodiment.

In the modified example 1 of the first embodiment, an example of the liquid droplet forming device is illustrated in which the configuration of the part of detecting the fluorescence emitted by the fluorescent particles 350 is modified. Note that, in the modified example 1 of the first embodiment, the description of a component that is the same as that of the above-described embodiment may be omitted. FIG. 5 is a schematic diagram exemplifying the liquid droplet forming device according to the modified example 1 of the first embodiment. Referring to FIG. 5, the liquid droplet forming device 1A differs from the liquid droplet forming device 1 (see FIG. 1) in the point that a mirror 40 is provided in front of the photodetector 60.

As described above, in the liquid droplet forming device 1A, by arranging the mirror 40 in front of the photodetector 60, the degrees of freedom on the layout of the photodetector 60 can be enhanced.

For example, when the nozzle 111 and the drop target object are brought close to each other, interference between the drop target object and the optical system (especially, the photodetector 60) of the droplet forming device 1 may occur in the layout of FIG. 1. However, by adopting the layout of FIG. 5, occurrence of the interference can be avoided.

Namely, by modifying the layout of the photodetector 60 as shown in FIG. 5, a distance (gap) between the drop target object on which the liquid droplet 310 drops and the nozzle 111 can be reduced, and the variation in the dropping positions can be reduced. As a result, dispensing accuracy can be enhanced.

Modified Example 2 of the First Embodiment

In the modified example 2 of the first embodiment, another example of the liquid droplet forming device is illustrated in which the configuration of the part of detecting the fluorescence emitted by the fluorescent particles 350 is modified. Note that, in the modified example 2 of the first embodiment, the description of the component that is the same as that of the above-described embodiment may be omitted.

Figure 6:
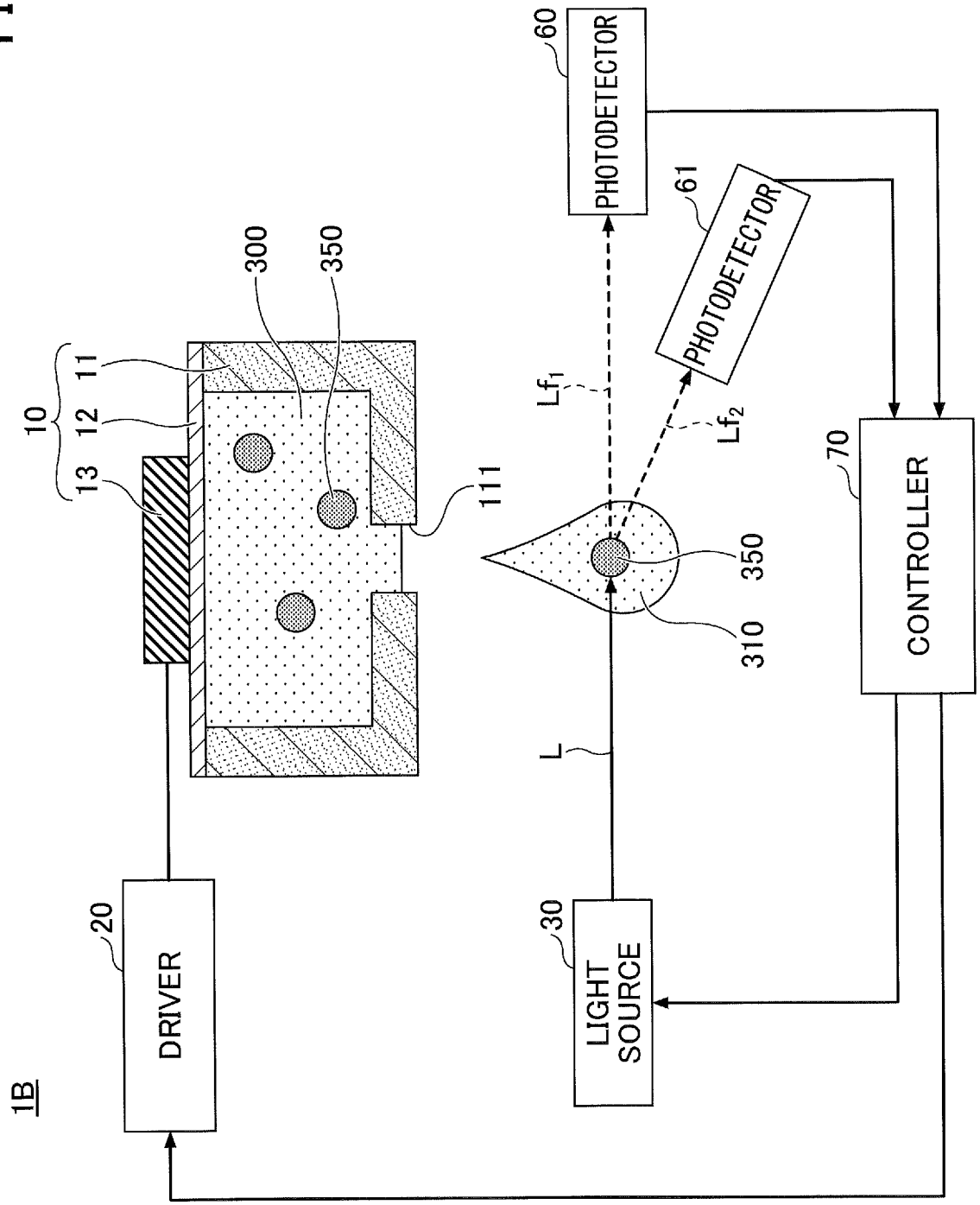
FIG. 6 is a schematic diagram exemplifying a droplet forming device according to a modified example 2 of the first embodiment.

FIG. 6 is a schematic diagram exemplifying the liquid droplet forming device according to the second modified example of the first embodiment. Referring to FIG. 6, the liquid droplet forming device 1B differs from the liquid droplet forming device 1 (see FIG. 1) in the point that, in addition to the photodetector 60 for receiving the fluorescence $Lf_1$ emitted from the fluorescent particles 350, a photodetector 61 for receiving the fluorescence $Lf_2$ emitted from the fluorescent particles 350 is provided.

Here, the fluorescence $Lf_1$ and the fluorescence $Lf_2$ represent parts of the fluorescence emitted in all directions from the fluorescent particles 350. The photodetectors 60 and 61 can be located at any positions at which the fluorescence emitted from the fluorescent particles 350 in different directions can be received, respectively. Here, three or more photodetectors may be arranged at positions at which the fluorescence emitted from the fluorescent particles 350 in different directions can be received, respectively. The photodetectors may be of the same specification or of the different specifications.

If there is one photodetector and a plurality of fluorescent particles 350 is included in the flying liquid droplet 310, the particle number detector 703 may erroneously detect the number of the fluorescent particles 350 included in the liquid droplet 310 (a count error occurs) due to overlapping of the fluorescent particles 350.

Figure 7:
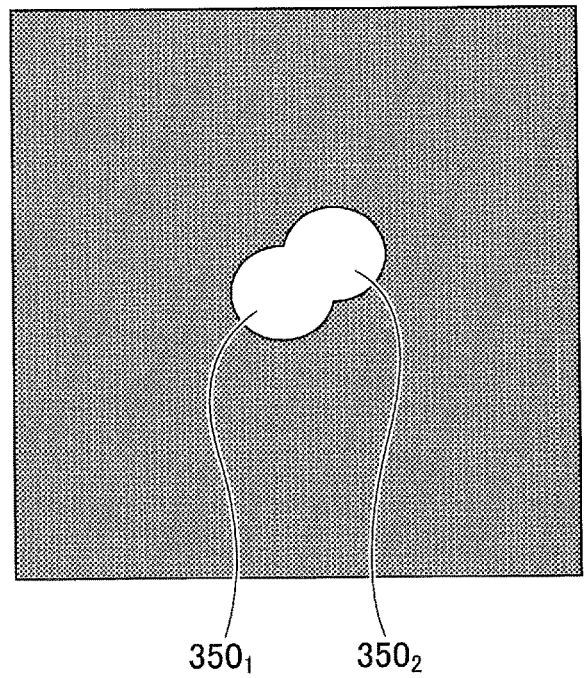
FIG. 7 is a diagram (version 1) exemplifying a case in which two fluorescent particles are included in a flying liquid droplet.
Figure 8:
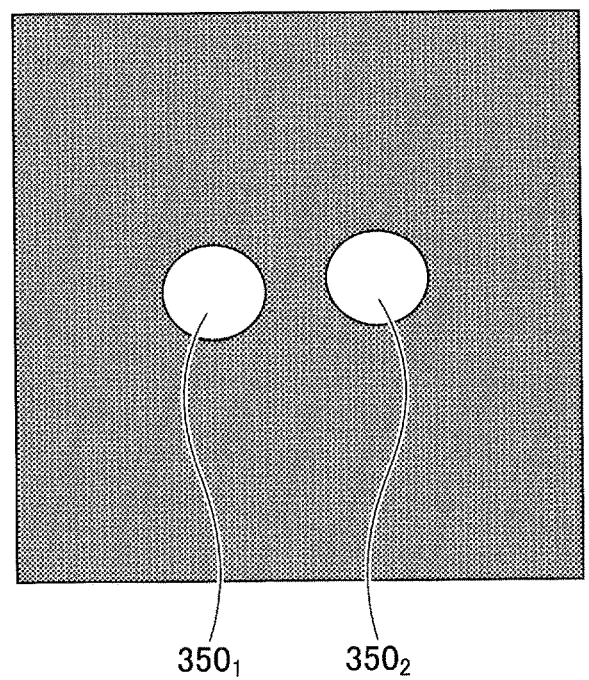
FIG. 8 is a diagram (version 2) exemplifying another case in which two fluorescent particles are included in a flying liquid droplet.

FIG. 7 and FIG. 8 are diagrams exemplifying cases in which two fluorescent particles are included in the flying liquid droplets. For example, cases are possible, such as a case, as shown in FIG. 7, in which the fluorescent particle $350_1$ and the fluorescent particle $350_2$ overlap, and a case, as shown in FIG. 8, in which the fluorescent particle $350_1$ and fluorescent particle $350_2$ do not overlap. By providing two or more photodetectors, the effect of overlapping of the fluorescent particles can be reduced.

As described above, the particle number detector 703 can detect a number of fluorescent particles by calculating a brightness value or an area value of the fluorescent particles by image processing, and by comparing the calculated brightness value or the calculated area value with a preconfigured threshold value.

When two or more photodetectors are installed, by adopting, among brightness values or area values obtained from the photodetectors, the data indicating the maximum value, occurrence of a count error can be suppressed. This is described in more detail by referring to FIG. 9.

Figure 9:
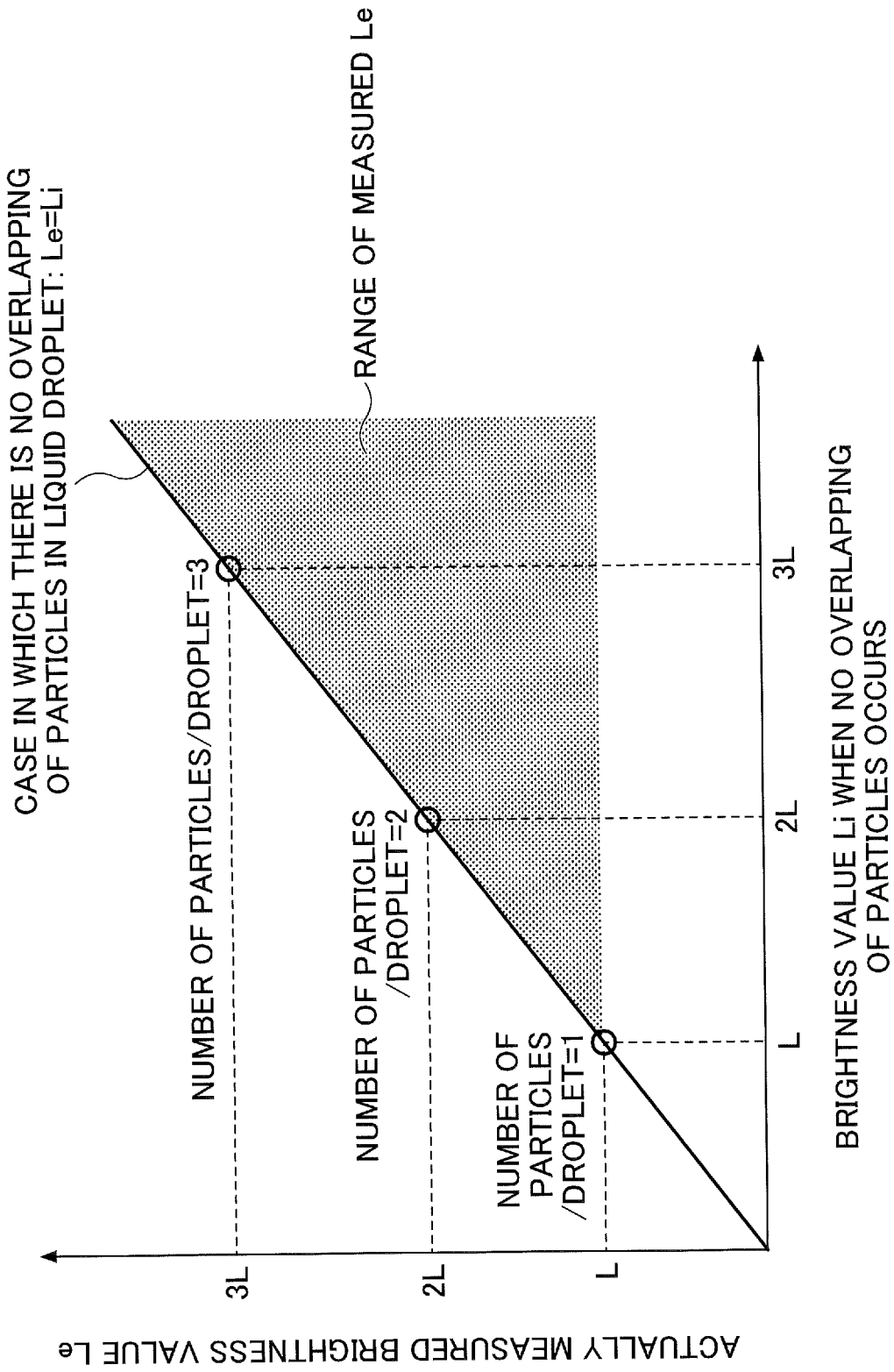
FIG. 9 is a diagram exemplifying relation between a brightness value Li for a case in which no overlapping of particles occurs and a brightness value Le that is actually measured.

FIG. 9 is a diagram exemplifying the relation between the brightness value Li when there is no overlapping among particles and the actually measured brightness value Le. As illustrated in FIG. 9, if there is no overlapping among particles, Le=Li. For example, if the brightness value of one particle is L, Le=L when the number of particles/droplet=1; and Le=nL when the number of particles/droplet=n (n: natural number).

However, in practice, if n is greater than or equal to 2, overlapping among particles may occur, and the actually measured brightness value becomes $L \leq Le \leq nL$ (the shaded portion in FIG. 9). Thus, if the number of particles/droplet=n, for example, the threshold value may be adjusted so that $(nL-L/2) \leq$ the threshold value $\leq (nL+L/2)$. Then, if a plurality of photodetector is installed, by adopting a data item indicating the maximum value among data items obtained from the photodetectors, respectively, occurrence of a count error can be suppressed. Note that, instead of the brightness value, an area value may be used.

Furthermore, if a plurality of photodetectors is installed, based on a plurality of shape data items that can be obtained, the number of the particles may be determined by an algorithm for estimating the particle numbers.

As described above, the droplet forming device 1B can further reduce a frequency of occurrence of the erroneous detection of the numbers of the fluorescent particles 350 because the droplet forming device 1B includes a plurality of photodetectors for receiving fluorescence emitted by the fluorescent particles 350 in the respective different directions.

Modified Example 3 of the First Embodiment

In the modified example 3 of the first embodiment, another example of the liquid droplet forming device is illustrated in which the configuration of a part for detecting fluorescence emitted by the fluorescent particles 350 is modified. Note that, in the modified example 3 of the first embodiment, the description of the component that is the same as that of the above-described embodiment may be omitted.

Figure 10:
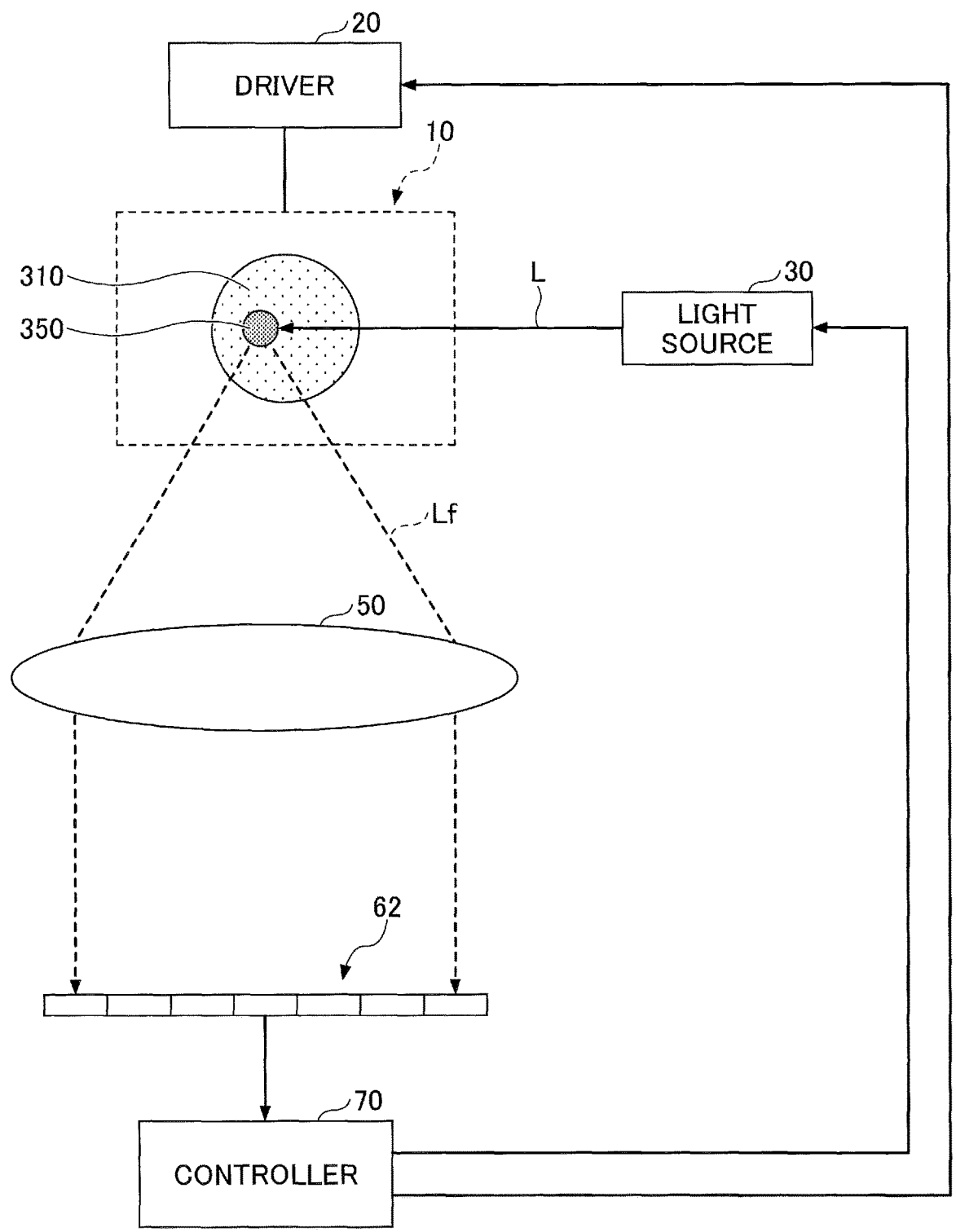
FIG. 10 is a schematic diagram exemplifying a droplet forming device according to a modified example 3 of the first embodiment.

FIG. 10 is a schematic diagram exemplifying the liquid droplet forming device according to the modified example 3 of the first embodiment, in which a part of the liquid droplet forming device is viewed from an upper part of the liquid droplet forming device. Referring to FIG. 10, the liquid droplet forming device 1C differs from the liquid droplet forming device 1 (see FIG. 1) in a point that the fluorescence Lf emitted from the fluorescent particles 350 is received by the photodetector 62 through a lens 50.

The photodetector 62 has a structure such that a plurality of photodetectors is formed in an array. The fluorescence Lf from the fluorescent particles 350 are guided to the respective photodetectors forming the photodetector 62 by the lens 50.

A lens with a high numerical aperture (NA: Numerical Aperture) may preferably be used as the lens 50. In particular, an objective lens or an fθ lens is preferable because light can be caused to orthogonally enter the photodetector 62, and positional dependence on the element can be prevented from occurring. Here, the objective lens is a lens with which an enlarged image with little aberration cab be obtained. The fθ lens is a lens such that y=fθ holds when an image height is y, a focal length is f, and a light incident angle to the lens is θ. As the photodetector 62, for example, a CCD array, a CMOS array, a photodiode array, etc., can be used. From a perspective of sensitivity and time response, it is most preferable to use a photodiode array.

In the liquid droplet forming device 10, by suitably arranging the liquid droplet 310 and the lens 50, the fluorescence emitted by the fluorescent particles 350 in different directions can be received by the photodetectors forming the photodetector 62. As a result, a size of, the liquid droplet forming device 10 can further be reduced.

Modified Example 4 of the First Embodiment

In the modified example 4 of the first embodiment, another example of the liquid droplet forming device is illustrated in which a configuration of a part of detecting fluorescence emitted by the fluorescent particles 350 is modified. In the fourth example of the first embodiment, the description of the component that is the same as that of the above-described embodiment may be omitted.

Figure 11:
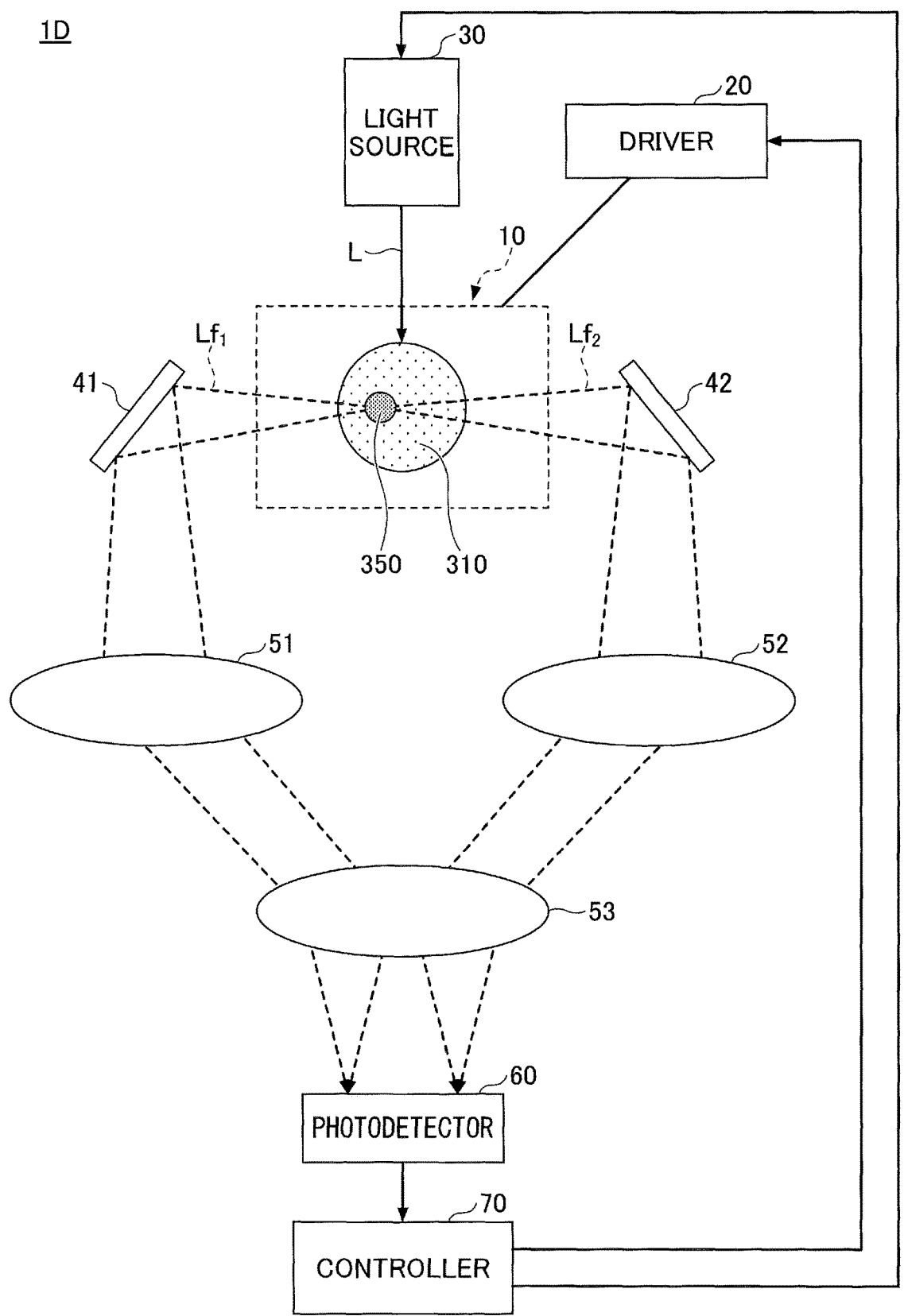
FIG. 11 is a schematic diagram exemplifying a droplet forming device according to a modified example 4 of the first embodiment.

FIG. 11 is a schematic diagram exemplifying the liquid droplet forming device according to the modified example 4 of the first embodiment, in which a part of the liquid droplet forming device is viewed from an upper part of the liquid droplet forming device. Referring to FIG. 11, the liquid droplet forming device 1D differs from the liquid droplet forming device 1 (see FIG. 1) in a point that fluorescence emitted from the fluorescent particles 350 is received by the photodetector 60 through a plurality of mirrors 41 and 42 and a plurality of lenses 51 through 53.

In the liquid droplet forming device 1D, fluorescence $Lf_1$ emitted from the fluorescent particles 350 is reflected by the mirror 41 to enter the lens 51, and further enters the lens 53 to form an image on the photodetector 60. The fluorescence $Lf_2$ that is emitted by the fluorescent particles 350 in a direction that is different from that of the fluorescence $Lf_1$ is reflected by the mirror 42 to enter the lens 52, and further enters the lens 53 to form an image on the photodetector 60. As the photodetector 60, a two-dimensional array of photodetectors can be used.

As described above, by arranging the plurality of mirrors 41 and 42 and the plurality of lenses 51 through 53 at the respective positions so that the fluorescence emitted by the fluorescent particles 350 in different directions can be entered, and by using the two-dimensional array of photodetectors as the photodetector 60, an image of the fluorescent particles 350 viewed from the right half can be captured by the right half in FIG. 11, and an image of the fluorescent particles 350 viewed from the left half can be captured by the left half.

As a result, images from a plurality of directions can be formed on the single photodetector 60, and a frequency of occurrence of erroneous detection of the number of fluorescent particles 350 by the particle number detector 703 can be reduced with an inexpensive configuration.

Modified Example 5 of the First Embodiment

In the modified example 5 of the first embodiment, an example of the liquid droplet forming device is illustrated in which the configuration of the liquid droplet discharger is modified. In the modified example 5 of the first embodiment, the description of the component that is the same as that of the above-described embodiment may be omitted.

Figure 12:
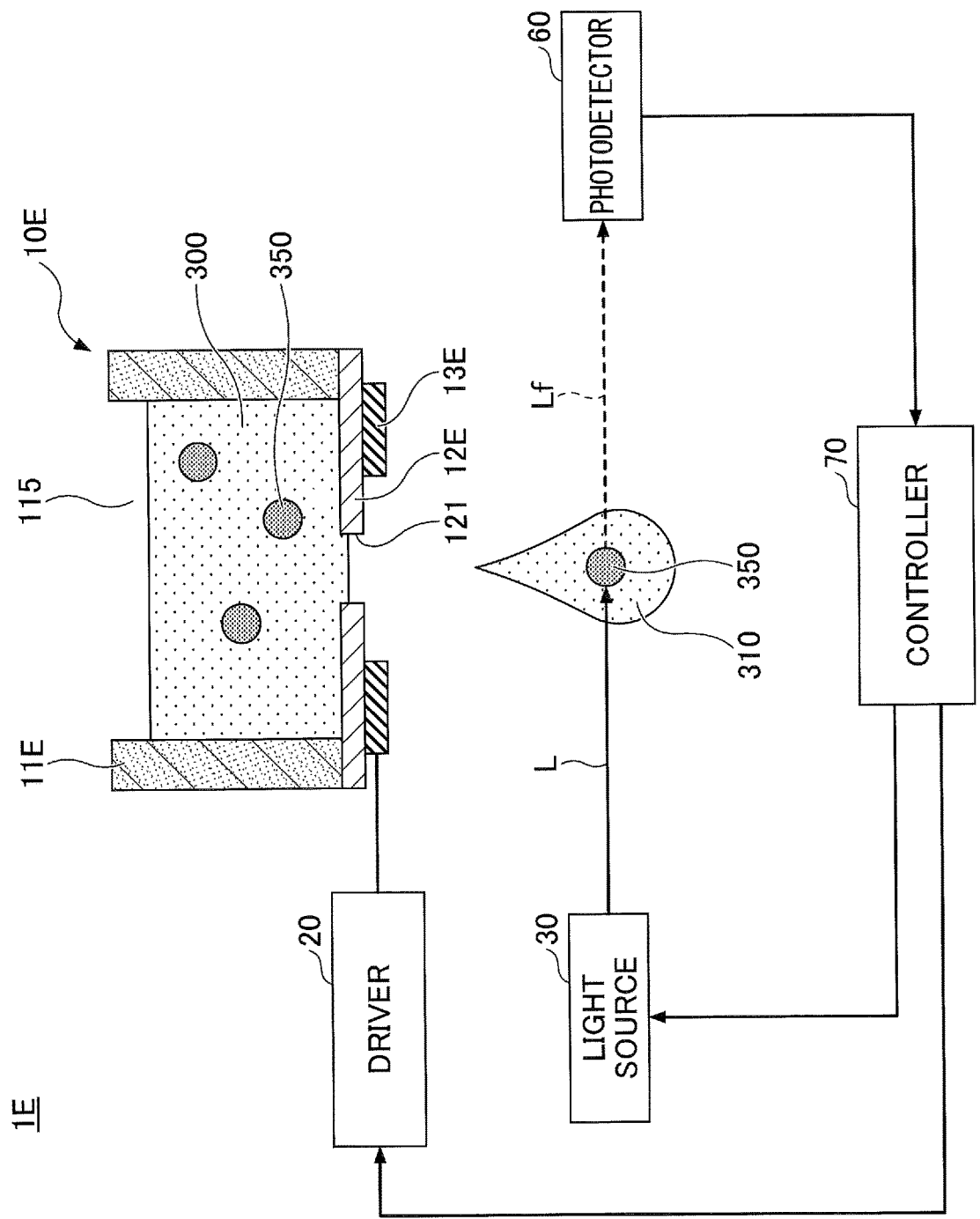
FIG. 12 is a schematic diagram exemplifying a droplet forming device according to a modified example 5 of the first embodiment.

FIG. 12 is a schematic diagram exemplifying the liquid droplet forming device according to the modified example 5 of the first embodiment. Referring to FIG. 12, the liquid droplet forming device 1E differs from the liquid droplet forming device 1 (see FIG. 1) in the point that the liquid droplet discharger 10 is replaced with a liquid droplet discharger 10E.

The liquid droplet discharger 10E includes a liquid chamber 11E; a membrane 12E; and a drive element 13E. At an upper part of the liquid chamber 11E, there is an atmospheric opening 115 for opening the inside of the liquid chamber 11E to the atmosphere, and the liquid chamber 11E is configured so that air bubbles mixed in the particle suspension liquid 300 can be discharged from the atmospheric opening 115.

The membrane 12E is a film shaped component secured to a lower end of the liquid chamber 11E. At an approximate center of the membrane 12E, a nozzle 121 that is a through hole is formed, and the particle suspension liquid 300 reserved in the liquid chamber 11E is discharged as the liquid droplet 310 from the nozzle 121 by the vibration of the membrane 12E. Since the droplet 310 is formed by the vibration inertia of the membrane 12E, the particle suspension liquid 300 can be discharged even if the particle suspension liquid 300 has high surface tension (high viscosity). The planar shape of the membrane 12E may be, for example, a circular shape; however, the planar shape of the membrane 12E may be an elliptical shape or a rectangular shape.

The material of the membrane 12E is not particularly limited; however, a material with certain stiffness may preferably be used because if the material is too soft, the membrane 12E easily vibrates so that it is difficult to immediately suppress the vibration at a time at which discharging is not performed. As the material of the membrane 12E, for example, a metal material, a ceramic material, or a polymer material with a certain degree of stiffness may be used.

Especially, when cells are used as the fluorescent particles 350, a material with low adhesion to cells and protein is preferable. In general, adhesion of cells depends on a contact angle between the material and water. When the material has high hydrophilicity or high hydrophobicity, the adhesion of the cells is low. As a material having high hydrophilicity, various types of metal materials and ceramics (metal oxides) may be used, and, as a material having high hydrophobicity, a fluorine resin can be used.

Other examples of such a material include stainless steel, nickel, aluminum, silicon oxide, alumina, zirconia, etc. Other than this, it can be considered to lower cell adhesiveness by coating the material surface. For example, the material surface may be coated with the above-described metal or metal oxide material, or the metal surface may be coated with a synthetic phospholipid polymer that simulates a cell membrane (for example, Lipidure, manufactured by NIPPON OIL CO. LTD.).

The nozzle 121 may preferably be formed at an approximate center of the membrane 12E as a through hole with an approximate circular shape. In this case, the diameter of the nozzle 121 is not particularly limited; however, in order to avoid clogging of the nozzle 121 with the fluorescent particles 350, the diameter of the nozzle 121 may preferably be greater than or equal to the twice the size of the fluorescent particle 350. When the fluorescent particles 350 are, for example, animal cells, and, in particular, when the fluorescent particles 350 are human cells, the diameter of the nozzle 121 may preferably be adjusted to be greater than or equal to 10 µm to 100 µm in accordance with the cells to be used because the size of the human cell is, in general, approximately from 0.5 µm to 50 µm.

However, if the liquid droplet is too large, it is difficult to achieve the object of forming a fine liquid droplet. Thus, the diameter of the nozzle 121 may preferably be less than or equal to 200 µm. Namely, in the liquid droplet discharger 10E, the diameter of the nozzle 121 may be typically in a range from 10 µm to 200 µm.

The drive element 13E is formed on a lower surface side of the membrane 12E. The shape of the drive element 13E can be designed to be adjusted to the shape of the membrane 12E. For example, if the planar shape of the membrane 12E is a circular shape, the drive element 13E with an annular planer shape (a ring shape) may preferably be formed around the nozzle 121. The drive method of the drive element 13E may be the same as that of the drive element 13.

The driver 20 can selectively (e.g., alternately) apply, to the drive element 13E, a discharge waveform for causing the membrane 12E to vibrate to form the liquid droplet 310 and a stirring waveform for causing the membrane 12E to vibrate within a range in which the liquid droplet 310 is not formed.

For example, by shaping the discharge waveform and the stirring waveform to be rectangular waves, and by adjusting the drive voltage of the stirring waveform to be lower than the drive voltage of the discharge waveform, it can be prevented that a liquid droplet 310 is formed by application of the stirring waveform. Namely, by adjusting the drive voltage to be high or low, the vibration state of the membrane 12E (the extent of the vibration) can be controlled.

In the liquid droplet discharger 10E, the drive element 13E is formed on the lower surface side of the membrane 12E. Accordingly, when the membrane 12 is caused to vibrate by the drive element 13E, a flow in a direction from the lower part to the upper part of the liquid chamber 11E can be generated. At this time, the motion of the fluorescent particles 350 is a motion from the bottom to the top, and a convection current occurs within the liquid chamber 11E and the particle suspension liquid 300 including the fluorescent particles 350 is stirred. By the flow from the bottom direction to the upper direction of the liquid chamber 11E, the precipitated and aggregated fluorescent particles 350 are uniformly dispersed inside the liquid chamber 11E.

Namely, in addition to applying the discharge waveform to the drive element 13E, by controlling the vibration state of the membrane 12E, the driver 20 can cause the particle suspension liquid 300 reserved in the liquid chamber 11E to be discharged from the nozzle 121 as the liquid droplet 310. Further, in addition to applying the stirring waveform to the drive element 13, by controlling the vibration state of the membrane 12E, the driver 20 can stir the particle suspension liquid 300 reserved in the liquid chamber 11E. Note that, during stirring, no liquid droplet 310 is discharged from the nozzle 121.

As described above, by stirring the particle suspension liquid 300 while the liquid droplet 310 is not formed, the fluorescent particles 350 can be prevented from precipitating and aggregating on the membrane 12E, and the fluorescent particles 350 can be uniformly dispersed in the particle suspension liquid 300. Accordingly, clogging of the nozzle 121 and variation in the number of the fluorescent particles 350 in the discharged liquid droplet 310 can be suppressed. As a result, the particle suspension liquid 300 including the fluorescent particles 350 can be stably discharged continuously as the liquid droplet 310 for a long time.

Additionally, in the liquid droplet forming device 1E, air bubbles may be mixed in the particle suspension liquid 300 in the liquid chamber 11E. In this case, in the liquid droplet forming device 1E, the atmospheric opening 115 is formed at the upper part of the liquid chamber 11E. Thus, the air bubbles mixed in the particle suspension liquid 300 can be discharged to the outside air through the atmospheric opening 115. As a result, the liquid droplets 310 can be continuously and stably formed without discarding a large amount of liquid for discharging the air bubbles.

In other words, if air bubbles are mixed in the vicinity of the nozzle 121, or if many air bubbles are mixed on the membrane 12E, the discharge state is affected. Accordingly, in order to stably forming liquid droplets for a long time, it is required to discharge the mixed air bubbles. Usually, air bubbles mixed on the membrane 12E move upward naturally or due to the vibration of the membrane 12E. However, the atmospheric opening 115 is formed in the liquid chamber 11E, and, thus, the mixed air bubbles can be discharged from the atmospheric opening 115. Accordingly, even if air bubbles are mixed in the liquid chamber 11E, a discharging failure can be prevented from occurring, and the liquid droplets 310 can be continuously and stably formed.

Note that, at a timing at which no liquid droplet is formed, the membrane 12E may be oscillated within a range in which no liquid droplet is formed, so that air bubbles are actively moved upward in the liquid chamber 11E.

Second Embodiment

In the second embodiment, an example is illustrated such that the liquid droplet forming device 1 is used for a device for dispensing fluorescent particles into wells. Note that, in the second embodiment, the description of the component that is the same as that of the above-described embodiment may be omitted.

Figure 13:
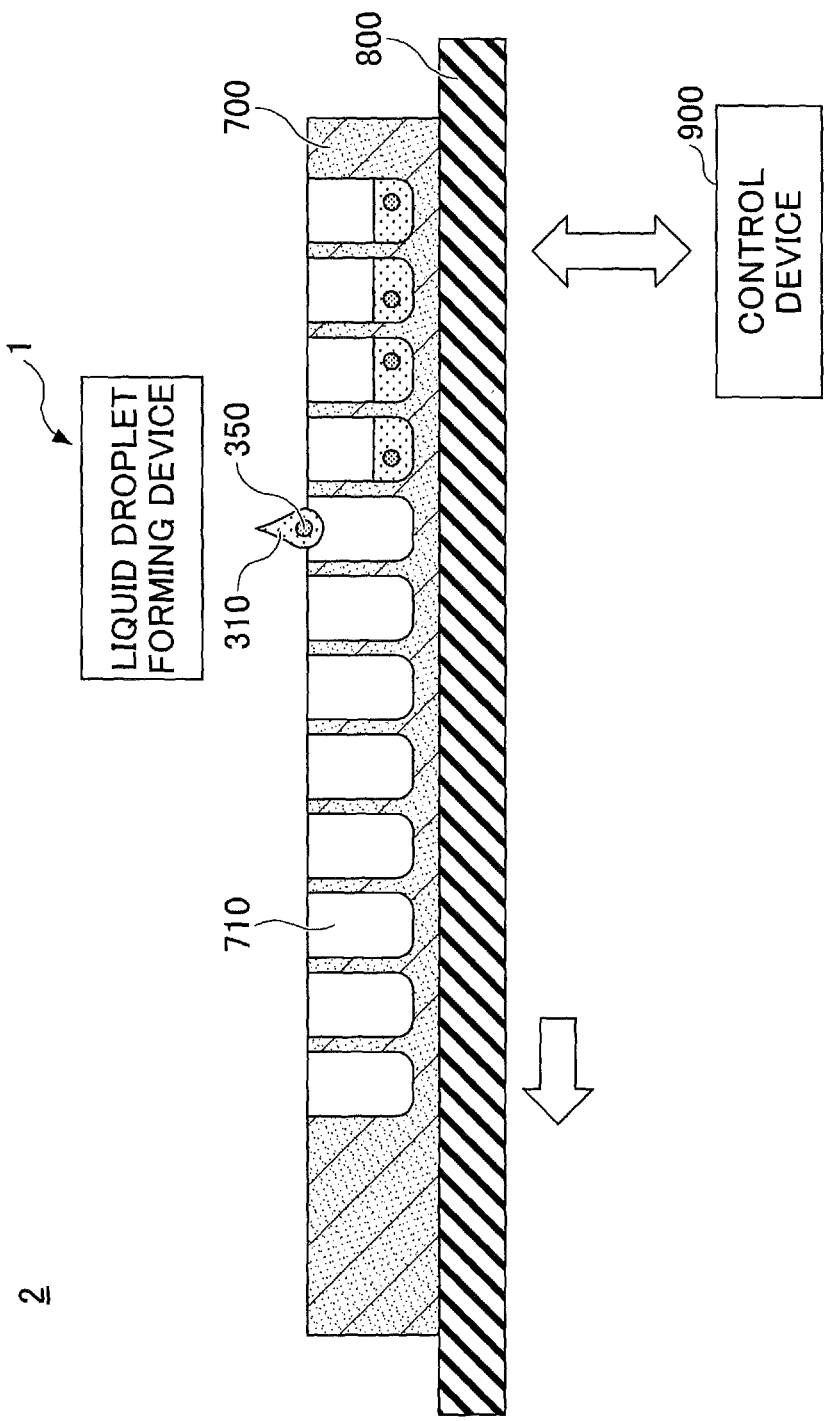
FIG. 13 is a schematic diagram exemplifying a dispensing device according to a second embodiment.

FIG. 13 is a schematic diagram exemplifying a dispensing device according to the second embodiment. Referring to FIG. 13, the dispensing device 2 includes the liquid droplet forming device 1; a base 700; a stage 800; and a controller 900. In the dispensing device 2, the base 700 is disposed on the stage 800, which is configured to be movable. In the base 700, a plurality of wells 710 (concave parts) are formed in which the droplets 310 discharged from the liquid droplet discharger 10 (see FIG. 1) of the liquid droplet forming device 1 are dropped. The controller 900 causes the stage 800 to be moved so as to control relative positional relation between the liquid droplet discharger 10 (see FIG. 1) of the liquid droplet forming device 1 and each of the wells 710. As a result, the liquid droplets 310 including the fluorescent particles 350 can be sequentially discharged from the liquid droplet discharger 10 (see FIG. 1) of the liquid droplet forming device 1 into the respective wells 710.

The controller 900 may be configured to include, for example, a CPU, a ROM, a RAM, and a main memory. In this case, various types of functions of the controller 900 may be implemented by reading out a program stored in the ROM onto the main memory to be executed by the CPU. However, a part or whole of the controller 900 may be implemented only by hardware. Additionally, the controller 900 may be physically formed of a plurality of devices.

Figure 14:
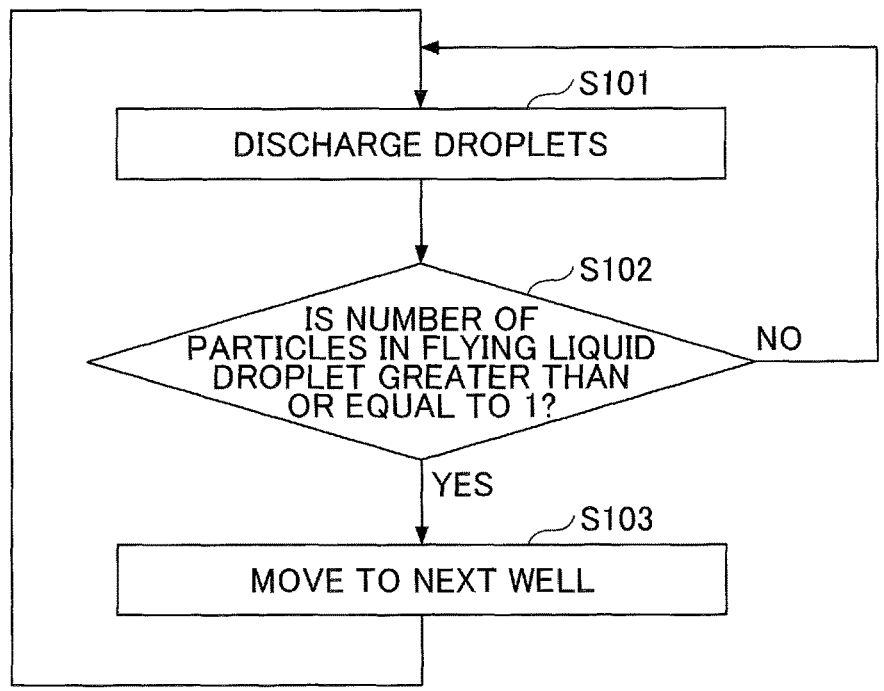
FIG. 14 illustrates an example of a flowchart illustrating an operation of the dispensing device according to the second embodiment.

FIG. 14 is an example of a flowchart illustrating an operation of the dispensing device according to the second embodiment. First, at step S101, the liquid droplet discharger 10 (see FIG. 1) of the liquid droplet forming device 1 discharges a liquid droplet 310 toward a predetermined well 710.

Next, at step S102, the particle number detector 703 (see FIG. 1) of the liquid droplet forming device 1 detects a number of the fluorescent particles 350 included in the flying liquid droplet 310, and transmits the detection result to the controller 900. If the detection result by the particle number detector 703 is not "greater than or equal to 1" (the case of zero), the operation of step S101 is repeated.

At step S102, if the detection result by the particle number detector 703 is "greater than or equal to 1," the process proceeds to step S103. At step S103, the controller 900 controls the stage 800 to move the base 700 so that the liquid droplet discharger 10 (see FIG. 1) of the liquid droplet forming device 1 is positioned to face the next well 710. Subsequently, the process proceeds to step S101 to repeat the same operation.

As a result, if a number of fluorescent particles 350 included in a liquid droplet 310 flying toward the well 710 is zero, another liquid droplet 310 is discharged again toward the same well 710. Accordingly, it can be ensured that the fluorescent particles 350 are dispensed into the plurality of wells 710.

Figure 15:
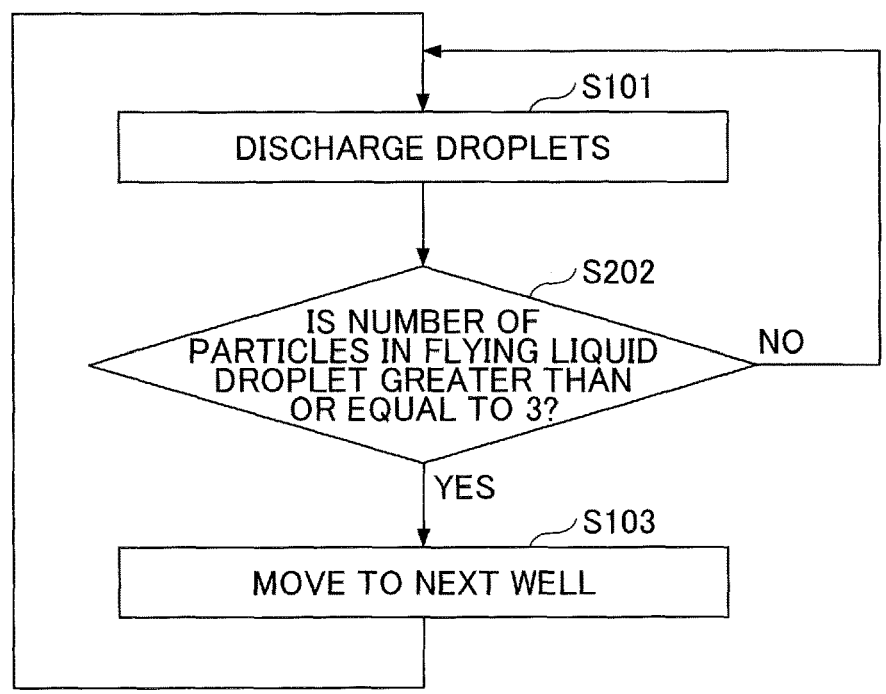
FIG. 15 illustrates another example of a flowchart illustrating an operation of the dispensing device according to the second embodiment.

Instead of presence or absence of the fluorescent particles 350 included in the flying liquid droplet 310, as illustrated in FIG. 15, a number of the fluorescent particles 350 included in the flying liquid droplet 310 can be detected. FIG. 15 is another example of a flowchart illustrating an operation of the dispensing device according to the second embodiment.

In FIG. 15, after executing step S101 that is the same as that of FIG. 14, first, the particle number detector 703 (FIG. 1) of the liquid droplet forming device 1 detects, at step S202, the number of the fluorescent particles 350 included in the flying liquid droplet 310, and sends the detection result to the controller 900. The operation of step S101 is repeated until the detection result by the particle number detector 703 becomes "greater than or equal to three."

Here, if the number of the fluorescent particles 350 included in the liquid droplet 310 increases, the detection accuracy of the particle number detector 703 may decrease. Accordingly, it is not required to configure the number of the fluorescent particles 350 included in the liquid droplet 310 discharged by once to be greater than or equal to three. For example, the number of the fluorescent particles 350 included in the liquid droplet 310 discharged by once may be configured to be zero or one. In this case, the operation of step S101 is repeated until the total of the number of the fluorescent particles 350 included in the one or more liquid droplets 310 becomes greater than or equal to three.

At step S202, if the detection result by the particle number detector 703 is "greater than or equal to three," the process proceeds to step S103, and step S103 that is the same as that of FIG. 14 is executed. Subsequently, the process proceeds to step S101, and the same operation is repeated. As a result, the florescent particles 350 can be dispensed so that the number of the fluorescent particles 350 in each well 710 is greater than or equal to three.

Note that, the function of moving the liquid droplet forming device 1 to a predetermined position along the stage 800 in the processes of FIG. 14 and FIG. 15 can be embedded, for example, as a program in the controller 900. Furthermore, instead of the liquid droplet forming device 1, any one of the liquid droplet forming devices 1A through 1E may be used.

Example 1

Figure 16:
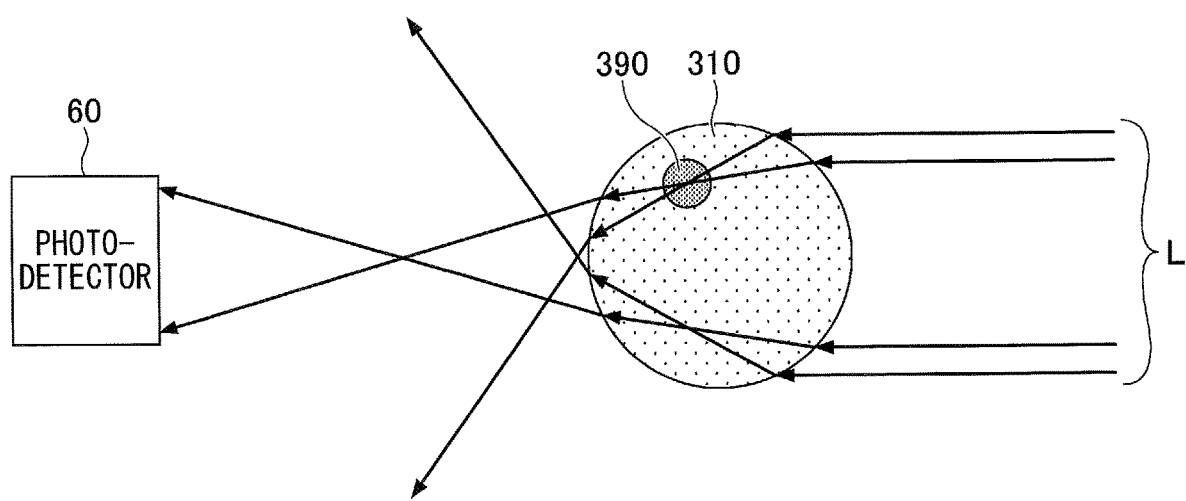
FIG. 16 is a diagram (version 1) illustrating an image of a particle other than a fluorescent particle captured by a photodetector.
Figure 17:
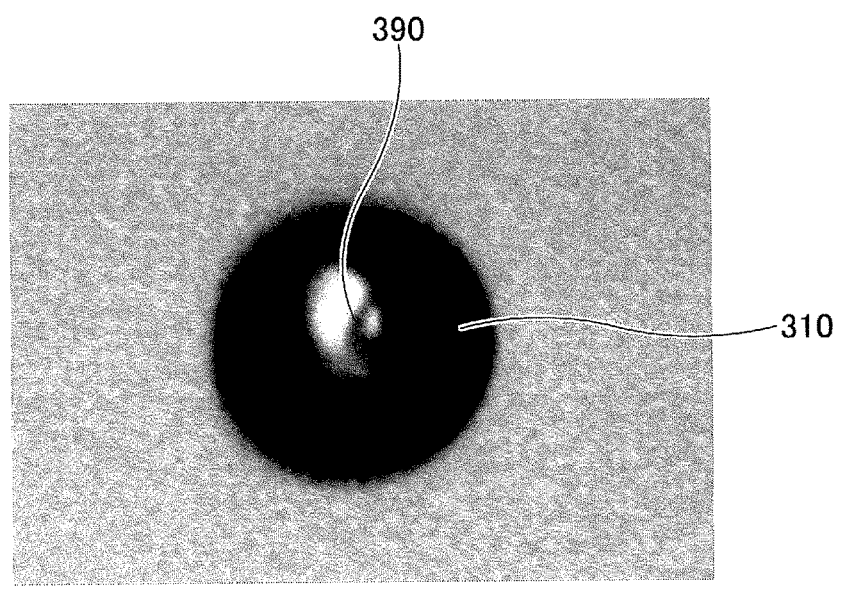
FIG. 17 is a diagram (version 2) illustrating the image of the particle other than the fluorescent particle captured by the photodetector.
Figure 18:
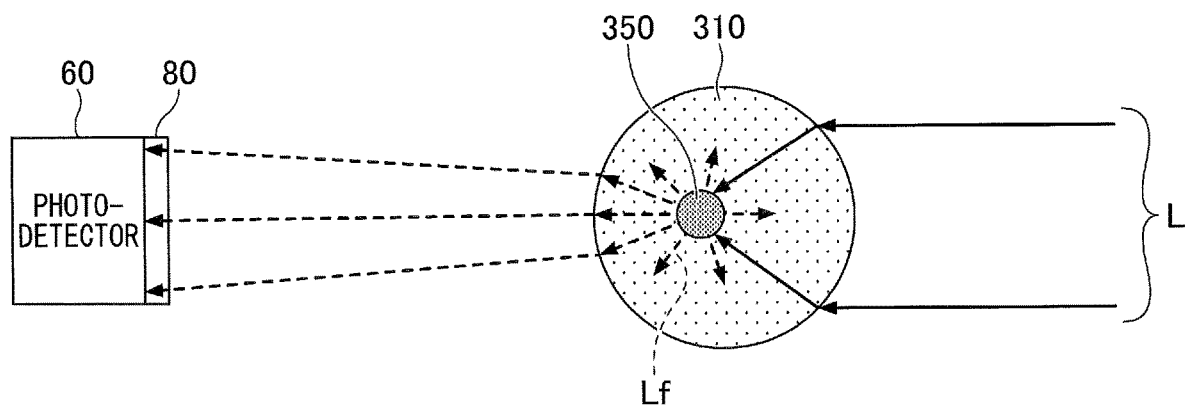
FIG. 18 is a diagram (version 1) illustrating an image of a fluorescent particle captured by the photodetector.
Figure 19:
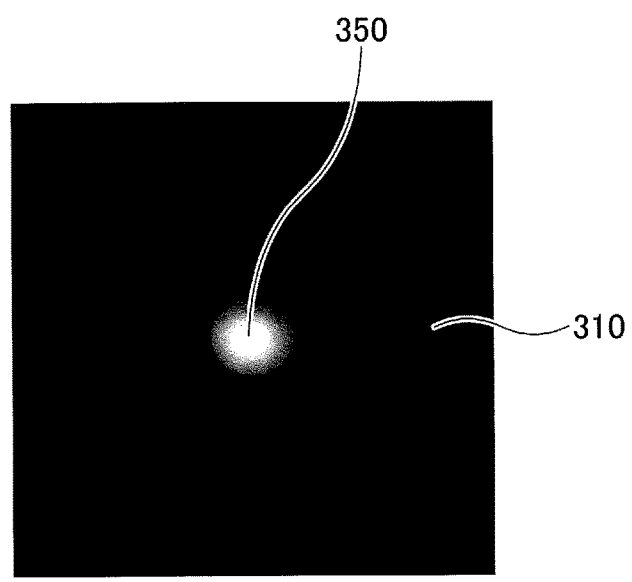
FIG. 19 is a diagram (version 2) illustrating the image of the fluorescent particle captured by the photodetector.

In the example 1, images of fluorescent particles 350 obtained by the photodetector 60 are compared between a case (reference example) in which light L is irradiated onto a liquid droplet 310 including a particle 390 other than a fluorescent particle and a case (example) in which the light L is irradiated onto the liquid droplet 310 including a florescent particle 350. The results are illustrated in FIG. 16 through FIG. 19. Here, FIG. 16 and FIG. 18 schematically illustrate a situation in which the light L is irradiated onto the liquid droplet 310, and FIG. 17 and FIG. 19 illustrate images captured by the photodetector 60.

As illustrated in FIG. 16 and FIG. 17, if the particle 390 other than a fluorescent particle is used, the flying liquid droplet 310 is shaded except for the central portion, and the particle 390 is hidden behind the liquid droplet 310. As a result, it is extremely difficult to detect the number of the particle 390 by the particle number detector 703.

In contrast, if the fluorescent particle 350 is used as illustrated in FIG. 18 and FIG. 19, the fluorescent particle 350 itself is an emitter for emitting fluorescence. Thus, an adverse situation does not occur such that the fluorescent particle 350 is hidden behind the liquid droplet 310 and that the fluorescent particle 350 is not recognized. Accordingly, the number of the fluorescent particles 350 can be accurately detected by the particle number detector 703.

Note that, in the example of FIG. 18 and FIG. 19, the fluorescence Lf from the fluorescent particles 350 is weaker than the light L from a laser. Thus, a filter 80 for attenuating the light L is installed in front of the photodetector 60. As a result, a very high contrast image of the fluorescent particles 350 can be captured. As the filter 80, for example, a notch filter can be used that attenuates a specific wavelength range including the wavelength of the light L.

Example 2

In example 2, a correct answer rate was evaluated for the detection (count) of the number of the fluorescent particles by the particle number detector 703. Specifically, evaluation was made while defining a count correct answer rate to be a ratio of cases in which a result of calculating the number of the fluorescent particles in the flying liquid droplet by the particle number detector 703 is equal to a result of visually confirming the number of the fluorescent particles after dropping (the true number of the fluorescent particles).

Figure 20:
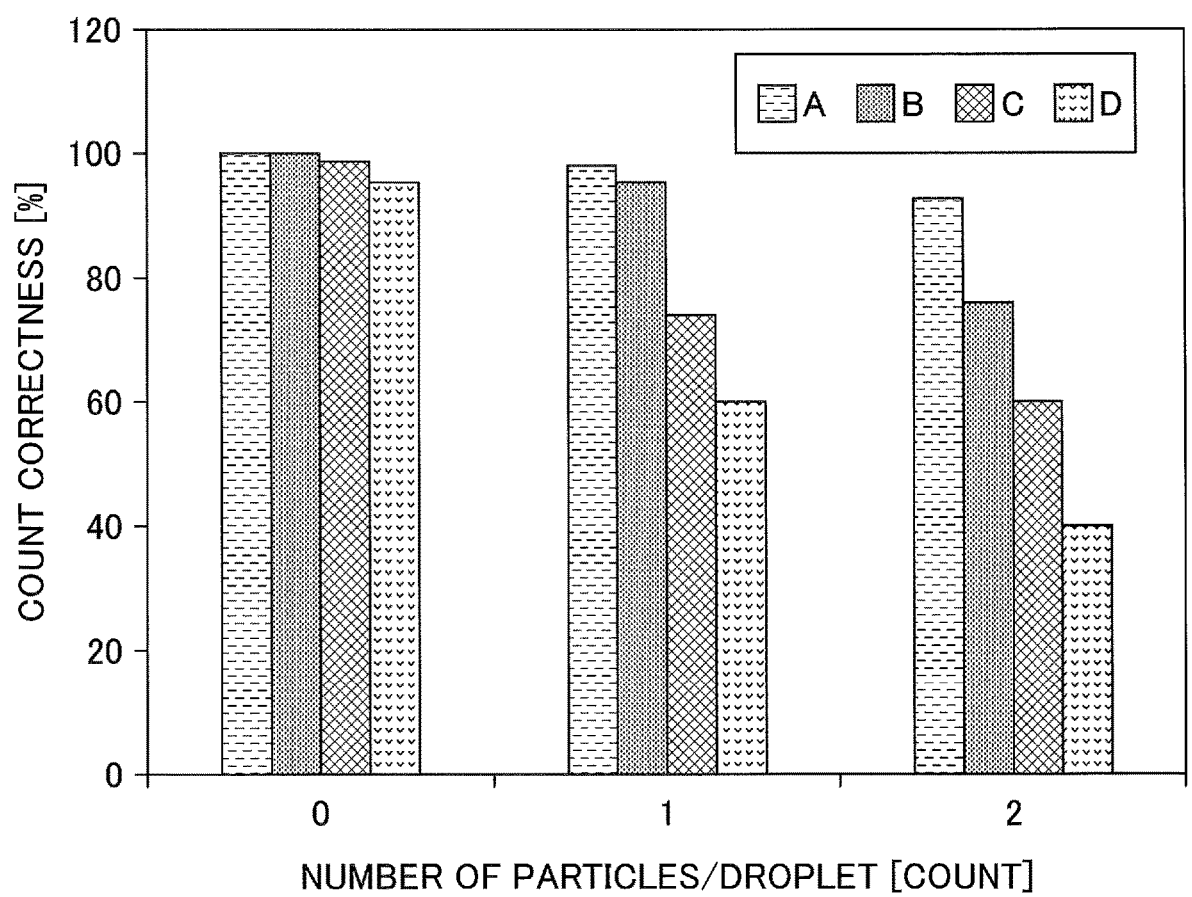
FIG. 20 is a diagram illustrating a result of evaluation of a correct answer rate for detecting a number of fluorescent particles by a particle number detector.

The evaluation results are shown in FIG. 20. In FIG. 20, "A" indicates a result of performing evaluation using the liquid droplet forming device 1B illustrated in FIG. 6. Additionally, "B," "C," and "D" indicate results of performing evaluation using the liquid droplet forming device 1 illustrated in FIG. 1. In each case, a high sensitivity camera (sCMOS pco, edge, manufactured by Tokyo Instruments) was used as the photodetector 60; a YAG laser (Explorer ONE-532-200-KE, manufactured by Spectra-Physics) was used as the light source 30; and "ImageJ" which is image processing software was used as the particle number detector 703.

Further, in "A" and "B," "SPHERO Fluorescent Nile Red particles, 1% w/v, 10 to 14 µm, manufactured by Bay Biosciences" was used as the fluorescent particle 350. In "C," a cell stained with a fluorescent dye (concentration $5\times10^6$ cells/mL, stained with cell tracker orange) was used as the fluorescent particle 350. In "D," a cell that was not stained by a fluorescent dye was used as the fluorescent particle 350.

As shown in FIG. 20, when no fluorescent particle was included in the liquid droplet 310, a high correct answer rate that is greater than or equal to 90% was obtained for any one of A through D. Namely, it can be said that the presence or absence of the fluorescent particle 350 included in the flying liquid droplet 310 can be detected with high accuracy in any one of A through D.

If the liquid droplet 310 includes one or more fluorescent particles, the correct answer rate tends to decrease, as the number of the fluorescent particles included in the liquid droplet 310 increases. However, for "A," a high correct answer rate that is greater than or equal to 90% is maintained.

Especially, for "A," the correct answer rate is high, even if two fluorescent particles are included in the liquid droplet 310. The liquid droplet forming device 1B includes a plurality of photodetectors that can receive fluorescence emitted by the fluorescent particles 350 in different directions. Accordingly, it can be considered that erroneous detection due to overlapping of the fluorescent particles 350 can be reduced. Note that, if the correct answer rate is greater than or equal to 50%, practical use is possible.

The preferred embodiments are described in detail above. However, various modifications and substitutions may be added to the above-described embodiments, without being limited to the above-described embodiments, and without departing from the scope described in the claims.

For example, when the XY direction is defined within the plane of the membrane 12 or 12E at a time at which the membrane 12 or 12E is not deformed, and when the normal direction of the membrane 12 or 12E is defined to be the Z direction, a configuration may be provided such that the liquid droplet forming device 1 can be independently moved in the X direction, Y direction, and Z direction. As a result, patterning of fluorescent particles within the XY plane and lamination of fluorescent particles in the Z direction can be easily performed.

The invention claimed is:

1. A liquid droplet forming device comprising:
   a liquid droplet discharger that discharges, as a liquid droplet, a particle suspension liquid in which one or more fluorescent particles are suspended;
   a light source for irradiating light onto the flying liquid droplet discharged and separated from the liquid droplet discharger;
   a plurality of photodetectors that receives, in respective different directions, fluorescence that is emitted by the one or more fluorescent particles included in the flying liquid droplet, the flying liquid droplet being separated from the liquid droplet discharger, in response to the light as excitation light; and
   a particle number detector that detects a number of the one or more fluorescent particles included in the flying liquid droplet by adopting a brightness value indicating the maximum value among brightness values obtained from the respective photodetectors.

2. The liquid droplet forming device according to claim 1, wherein the information is a light quantity.

3. The liquid droplet forming device according to claim 1, wherein the one or more fluorescent particles are cells.

4. The liquid droplet forming device according to claim 3, wherein the one or more fluorescent particles are cells stained with a fluorescent dyes, or cells capable of expressing a fluorescent protein.

5. The liquid droplet forming device according to claim 1, wherein the liquid droplet discharger includes
   a liquid reservoir for reserving the particle suspension liquid, and
   a membrane in which a nozzle is formed, and
   wherein the membrane causes, by vibration, the particle suspension liquid reserved in the liquid reservoir to be discharged from the nozzle as the liquid droplet.

6. The liquid droplet forming device according to claim 1, wherein the light is pulsed light emitted from the light source in synchronization with discharging of the liquid droplet.

7. The liquid droplet forming device according to claim 1, wherein the photodetector is disposed at a location at which the light does not directly enter.

8. The liquid droplet forming device according to claim 1, wherein a filter for attenuating a wavelength range of the light is provided at a light receiving surface side of the photodetector.

9. A dispensing device comprising:
   a liquid droplet forming device including
      a liquid droplet discharger that discharges, as a liquid droplet, a particle suspension liquid in which one or more fluorescent particles are suspended,
      a light source for irradiating light onto the flying liquid droplet discharged and separated from the liquid droplet discharger,
      a plurality of photodetectors that receives, in respective different directions, fluorescence that is emitted by the one or more fluorescent particles included in the flying liquid droplet, the flying liquid droplet being separated from the liquid droplet discharger, in response to the light as excitation light, and a particle number detector that detects a number of the one or more fluorescent particles included in the flying liquid droplet by adopting a brightness value indicating the maximum value as one brightness values obtained from the respective ohotodetectors;

a base in which a plurality of concave portions is formed in which t droplets discharged from the liquid droplet discharger are dropped; and a controller that controls relative positional relation between the liquid droplet discharger and each of the plurality of concave portions.

10. The liquid dispensing device according to claim 9, wherein, in response to detecting that the number of the one or more fluorescent particles included in the flying liquid droplet discharged toward one of the concave portions is zero, the liquid dispensing device discharges the liquid droplet toward the one of the concave portions again.

11. A method of preparing a base material comprising:

discharging by a liquid droplet discharger, as a liquid droplet, a panicle suspension liquid in which one or more cells are suspended, each of the one or more cells including a fluorescent dye;

irradiating tight onto the flying liquid droplet that is discharged and separated from the liquid droplet discharger;

receiving, using a plurality of photodetectors light from the one or more cells included in the flying liquid droplet, the flying liquid droplet being separated from the liquid droplet discharger, each of the one or more cells including the fluorescent dye, wherein the plurality of photodetectors receives the light in respective different directions; and detecting, by adopting a brightness value indicating the maximum value among brightness values obtained from the respective photodetectors, a number of the one or more cells included in the flying liquid droplet, the flying liquid droplet being separated from the liquid droplet discharger, each of the one or more cells including the fluorescent dye, and dropping the discharged droplets onto the base material in which a plurality of concave portions is formed to prepare the base material in which the concave portions include respective preset numbers of cells.

* * * * *